United States Patent [19]

Chi

[11] Patent Number: 5,843,352
[45] Date of Patent: Dec. 1, 1998

[54] PRODUCTION METHOD FOR PERIPHERAL ORNAMENTAL STRIPS FOR FOAMED INSOLES

[76] Inventor: Cheng-Hsian Chi, No. 15, Lane 22, Tung Hsing St., Taichung, Taiwan

[21] Appl. No.: 790,201

[22] Filed: Feb. 5, 1997

[51] Int. Cl.⁶ .................. B29C 44/06; B29C 44/12
[52] U.S. Cl. .................. 264/45.1; 264/51; 264/157; 264/245; 264/293
[58] Field of Search .................. 264/54, 293, 245, 264/138, 153, 157, 45.1, 51

[56] References Cited

U.S. PATENT DOCUMENTS

| | | | |
|---|---|---|---|
| 3,836,624 | 9/1974 | Ferris | 264/293 |
| 4,296,053 | 10/1981 | Doerer et al. | 264/54 |
| 5,177,824 | 1/1993 | Ou | 12/146 BR |
| 5,308,420 | 5/1994 | Yang | 264/45.1 |
| 5,318,645 | 6/1994 | Yang | 264/45.1 |
| 5,350,544 | 9/1994 | Bambara et al. | 264/321 |
| 5,427,372 | 6/1995 | Ratner et al. | 264/293 |
| 5,494,625 | 2/1996 | Hu | 264/293 |
| 5,503,786 | 4/1996 | Yang | 264/45.1 |
| 5,560,877 | 10/1996 | Yung et al. | 264/293 |

*Primary Examiner*—Allan R. Kuhns
*Attorney, Agent, or Firm*—Connolly & Hutz

[57] ABSTRACT

The present invention relates to a production method for ornamental strips, wherein castings of dimensions smaller than or equal to the final product are pressed under heat and molded. An increased range of variations is achieved by fusing together the casting of the ornamental strip and plastic platelets of various forms, colors or material hardness, which are put on the castings. By flexibly adapting the production method to specific needs, production time and cost are saved.

6 Claims, 6 Drawing Sheets

PRODUCTION METHOD FOR PERIPHERAL ORNAMENTAL STRIPS FOR FOAMED INSOLES

BACKGROUND OF THE INVENTION

1. Field of the Invention

The present invention relates to a method for producing peripheral ornamental strips for foamed insoles.

2. Description of Related Art

The sole of a common sports shoe comprises an insole layer and a wear-resistant rubber layer, glued to the bottom side of the insole layer. The material of the insole layer is elastic and durable and is a mixture of ethylene vinyl acetate (EVA), a foaming component (blowing agent) and a binder (crosslinking agent). The material is stirred, foamed by heating and cut into shape, forming insoles, which in use absorb shocks and are comfortable to wear.

Conventionally, as shown in FIG. 1, an ornamental strip 1 is glued to the edge of the sole 2. When producing the ornamental strip 1, it is first foamed into its shape, then by heating glued on the insole. However, since the ornamental strip is just attached to the insole by gluing rather than being a unit with the insole, the connection is not always stable and may loosen under rough conditions, as in sports.

SUMMARY OF THE INVENTION

The main object of the present invention is to provide a production method for ornamental strips, wherein castings of dimensions smaller than or equal to the final product are pressed under heat and molded.

Another object of the present invention is to provide a production method for peripheral strips for foamed insoles, which have an increased range of variations, by fusing together the casting of the ornamental strip and plastic platelets of various forms, colors or material hardness, which are put on the castings.

A further object of the present invention is to provide a production method for peripheral strips for foamed insoles, which saves production time and cost, by flexibly adapting the production method to specific needs.

The present invention can be more fully understood by reference to the following description and accompanying drawings.

DETAILED DESCRIPTION OF THE PREFERRED EMBODIMENTS

Figure 1:
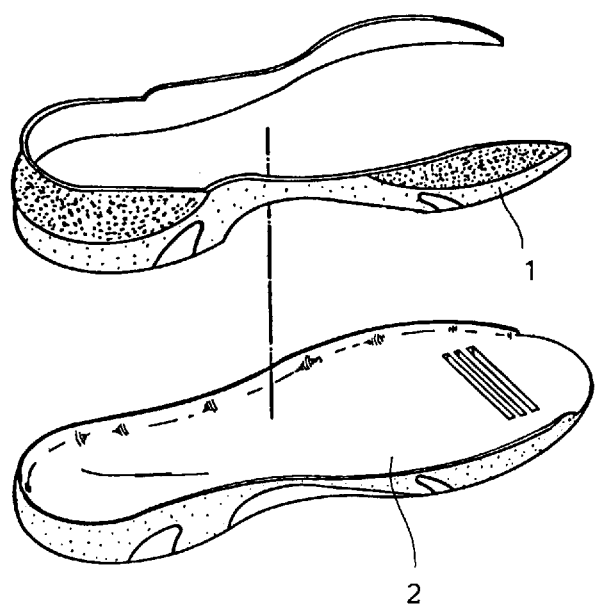
FIG. 1 (prior art) is a perspective view of an insole and a peripheral ornamental strip.
Figure 2:
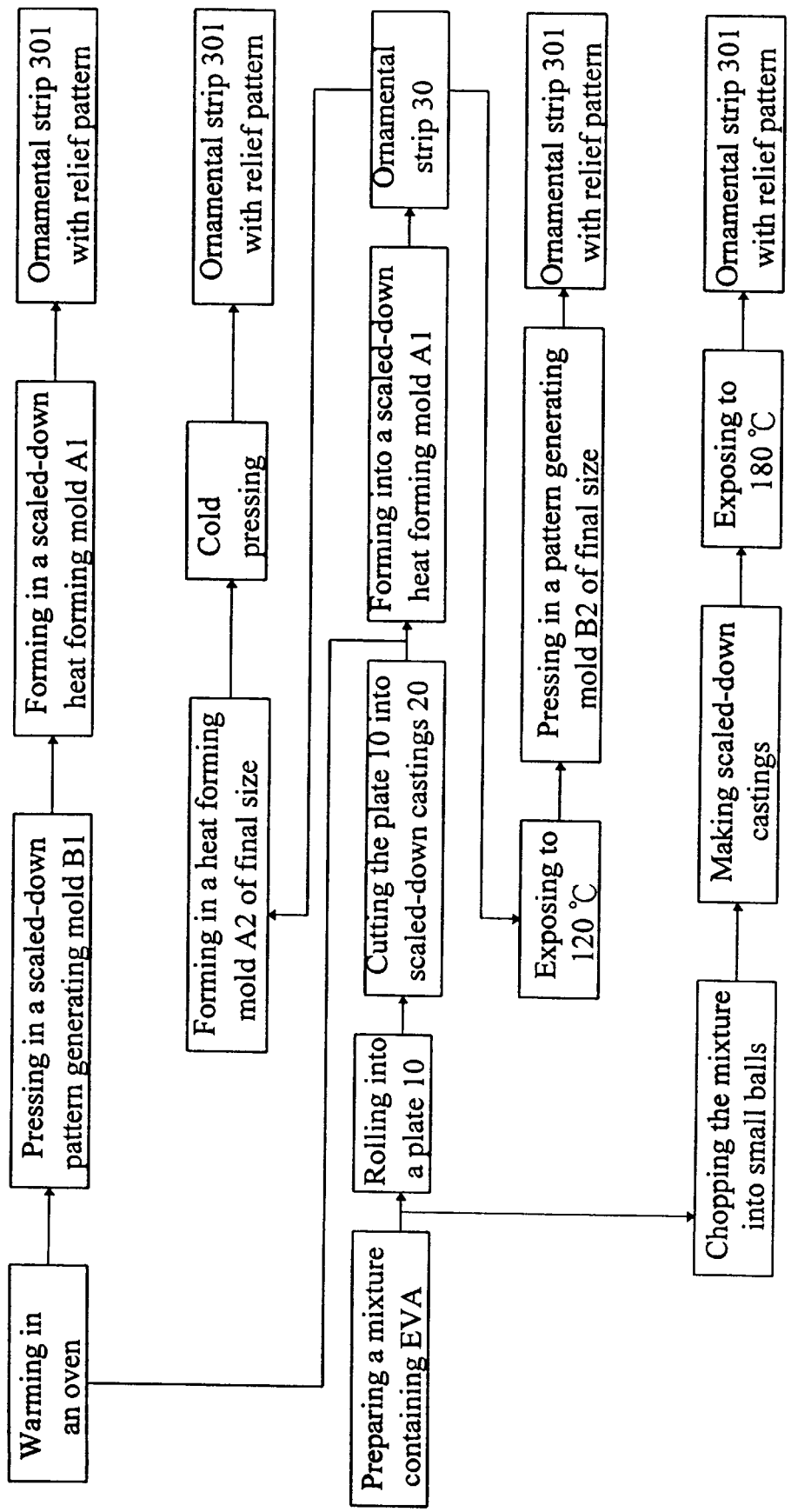
FIG. 2 is a flowchart of the production process of the present invention.
Figure 3:
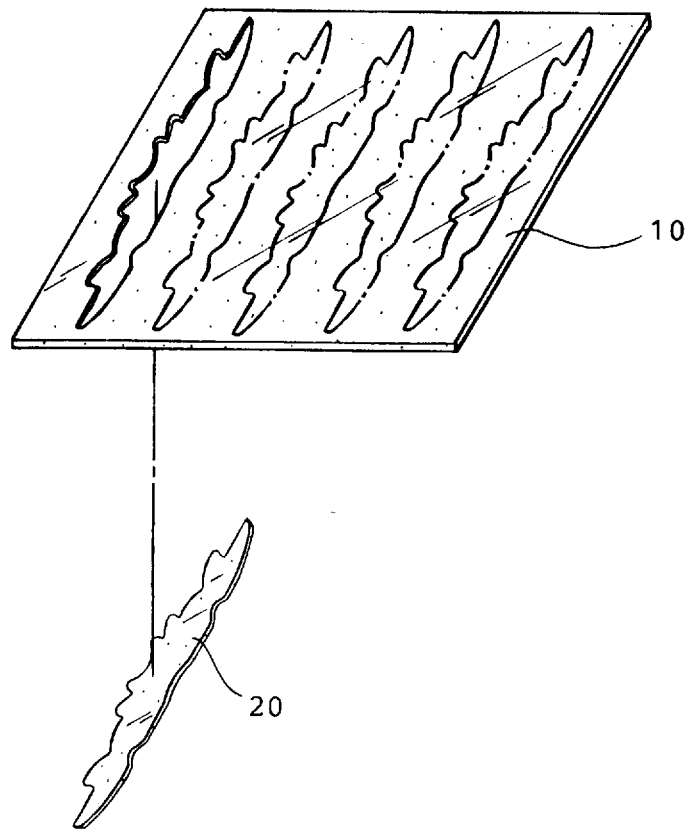
FIG. 3 is a schematic illustration of the plate with the scaled down ornamental strips to be cut out.
Figure 4:
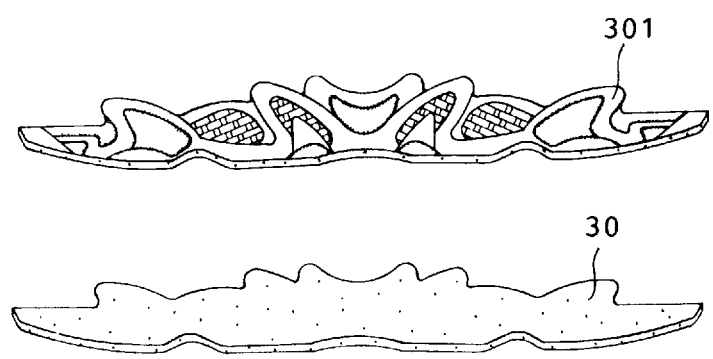
FIG. 4 is a perspective view of the finished perpheral ornamental strip of the present invention.
Figure 5:
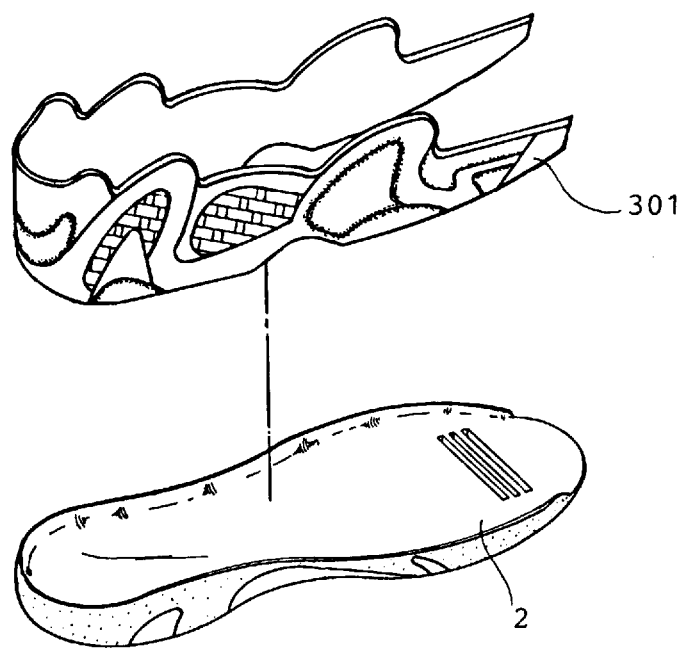
FIG. 5 is a perspective view of the finished perpheral ornamental strip of the present invention, as it is attached to an insole.

Referring to FIGS. 2–6, in the production process of the present invention, a material which is the conventional mixture of ethylene vinyl acetate (EVA), a foaming component (blowing agent) and a binder (crosslinking agent) is prepared and stirred. The material is then rolled into a plate 10. From the plate 10, castings 20 of the shape of ornamental strips, but of a smaller size, are cut out. Then the castings 20 are each put into a heat forming mold A1 of also scaled down size and exposed to a heat of 180° C. for a certain time. Within the heat forming mold A1, each casting 20 undergoes homogeneous pressure. After opening the heat forming mold A1, the casting 20 gets into contact with air and expands into an ornamental strip 30 of the final shape and size. This production method is suitable for ornamental strips 30 of simple shape.

In order to produce ornamental strips with a relief pattern, the scaled down castings 20 are warmed in an oven at a temperature of 70° C.–90° C., which is still too low for foaming the castings 20. Then the warmed castings 20 are each put into a pattern generating mold B1 of scaled down size, where they undergo cold pressing. The castings 20 now have a relief pattern, and are each put into a heat forming mold A1 of also scaled down size and exposed to a heat of 180° C., undergoing homogeneous pressure. After a certain time the heat forming mold A1 is opened. The casting 20 gets into contact with air and expands into an ornamental strip 301 of the final shape and size, ready to be attached to the periphery of the insole 2.

Ornamental strips 30 of a simple shape without relief pattern are further workable. In this further working, the ornamental strips 30 of a simple shape are heated to 120° C. and then put into a pattern generating mold B2 of equal size for cold pressing, wherein the surface of the pattern generating mold has a relief pattern. This completes the production of ornamental strips 301. In another additional working of ornamental strips 30 of a simple shape, the ornamental strips 30 are heated in a heat forming mold A2 of equal size, then cold pressed into their final shape to become ornamental strips 301. By combining pattern generating molds of scaled-down size B1 and of final size B2 and of heat forming molds of scaled-down size A1 and of final size A2, the production process of ornamental strips is adaptable to specific needs, resulting in reduced production cost, less waste of material and improved quality.

In another variant of the production process, the material EVA is chopped into numerous small balls. From these, by injection die-casting scaled-down castings of ornamental strips are made. Then the castings are each exposed to a heat of 180° C. for a certain time. After exposing to the heat of 180° C., the castings each gets into contact with air and expands into an ornamental strip of the final shape and size. This production method again is suitable for ornamental strips of simple shape.

Figure 6:
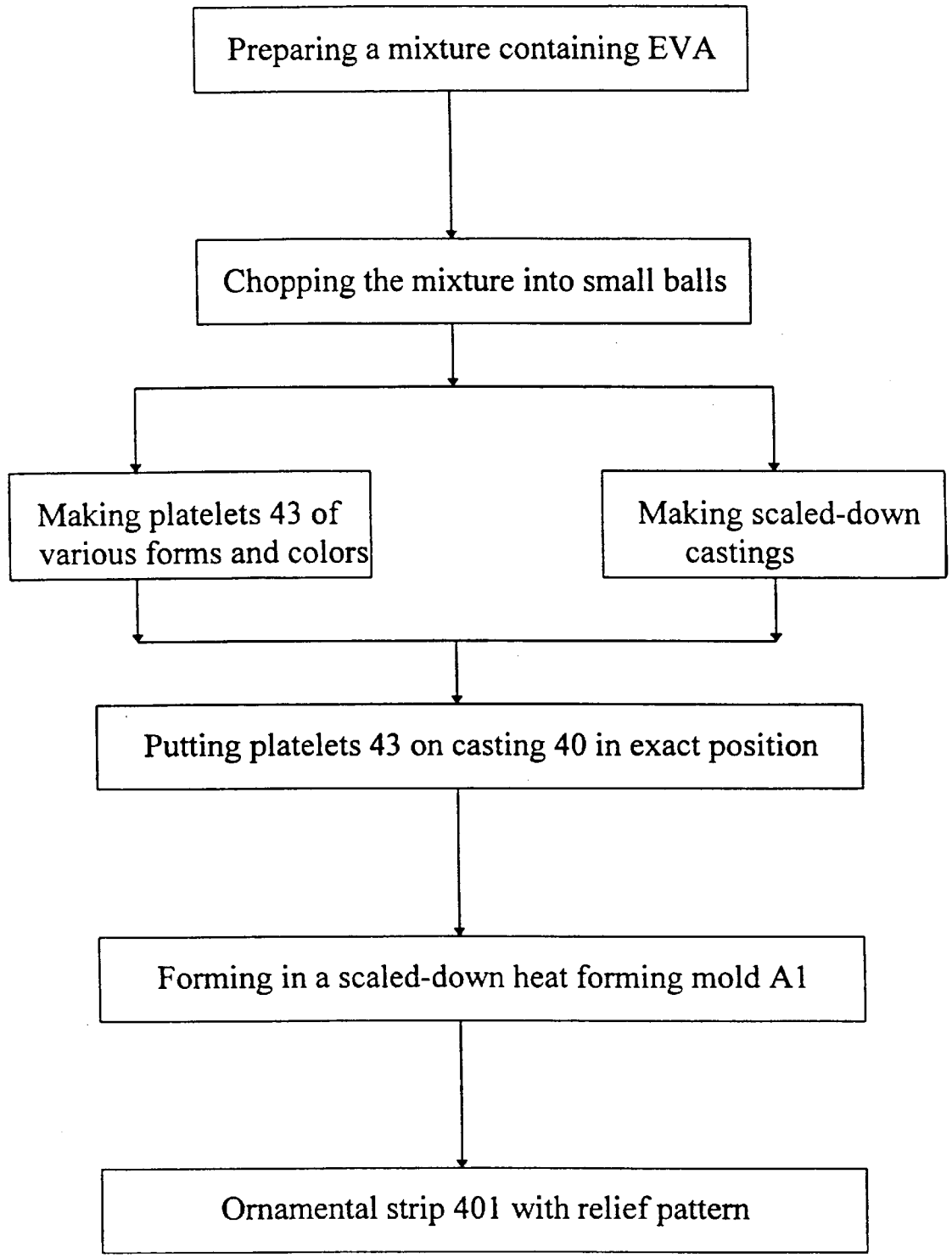
FIG. 6 is a flowchart of the production process of a multicolored ornamental strip with a relief pattern.
Figure 7:
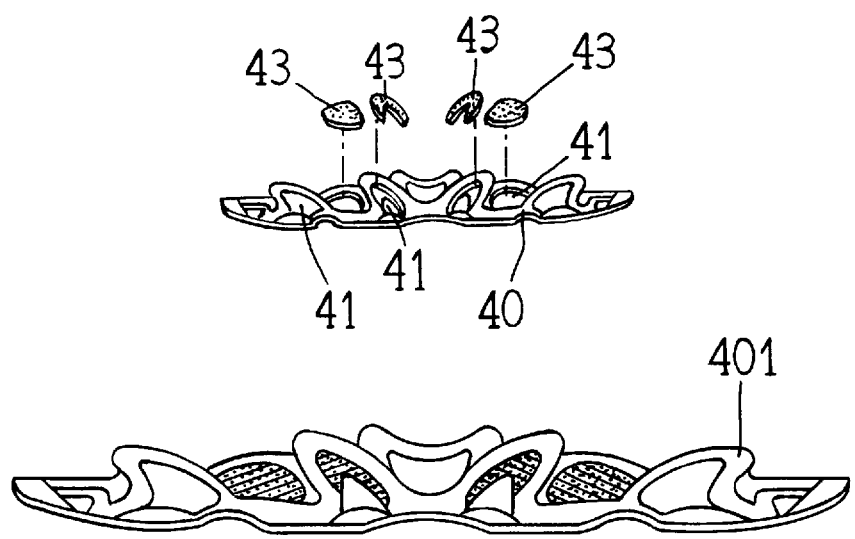
FIG. 7 is a schematic illustration of the casting of a multicolored ornamental strip with a relief pattern with plastic pieces to be fit in before foaming.

In order to produce multi-colored ornamental strips with a relief pattern, as shown in FIGS. 6 and 7, the material EVA is, by cutting or injection die-casting, formed into scaled-down castings 40 and platelets 43. The platelets 43 have various forms, colors, and durability. The castings 40 each have small depressions 41, which accommodate a platelet 43 each, allowing for a large range of color variations. The castings 40 with the platelets 43 are heated at 180° C. in heat forming molds A1. Therein, the platelets 43 fuse with the castings 40. After opening the heat forming mold A1, the castings 40 get into contact with air and expand into multi-colored ornamental strips 401 of the final shape and size.

What is claimed is:

1. A method for producing ornamental strips for foamed insoles, comprising the steps of:

preparing a mixture containing ethylene vinyl acetate (EVA);

rolling out said mixture into a plate;

cutting castings out of said plate, said castings being scaled down, as compared to the size of said ornamental strips;

heating said castings in heat forming molds, whose size is scaled down, as compared to the size of said ornamental strips, at a temperature of 180° C.; and exposing said castings to air, wherein said castings expand to the size of said ornamental strips.

2. A method for producing ornamental strips for foamed insoles according to claim 1, wherein between the steps of rolling out said castings and heating said castings at 180° C., said castings are warmed at 70° C.–90° C. and then cold-pressed in pattern generating molds, whose size is scaled down, as compared to the size of said ornamental strips.

3. A method for producing ornamental strips for foamed insoles according to claim 2, wherein said castings, prior to said heating, already have a relief pattern.

4. A method for producing ornamental strips for foamed insoles according to claim 1, wherein said castings, already having expanded to the size of said ornamental strips, are exposed to a temperature of 120° C. and then put in pattern generating molds of the size of said ornamental strips, so as to create a relief pattern on said castings.

5. A method for producing ornamental strips for foamed insoles according to claim 1, wherein said castings, already having expanded to the size of said ornamental strips, are heated in heat forming molds and then pressed at room temperature, so as to create a relief pattern on said castings.

6. A method for producing ornamental strips for foamed insoles, comprising the steps of:

preparing a mixture containing ethylene vinyl acetate (EVA);

forming a plurality of castings and a plurality of platelets respectively by cutting or injection die-casting said mixture, scaling down said plurality of castings and said plurality of platelets, as compared to the size of said ornamental strips, wherein each of said plurality of castings has a plurality of depressions and a platelet is fit in each of said plurality of depressions;

heating said castings in heat forming molds, whose size is scaled down, as compared to the size of said ornamental strips, at a temperature of 180° C., so as to fuse said plurality of platelets with said plurality of castings; and exposing said castings to air, wherein said castings expand to the size of said ornamental strips.

* * * * *